B. R. LONG.
PIPE COUPLING.
APPLICATION FILED AUG. 2, 1910.
1,046,817.
Patented Dec. 10, 1912.
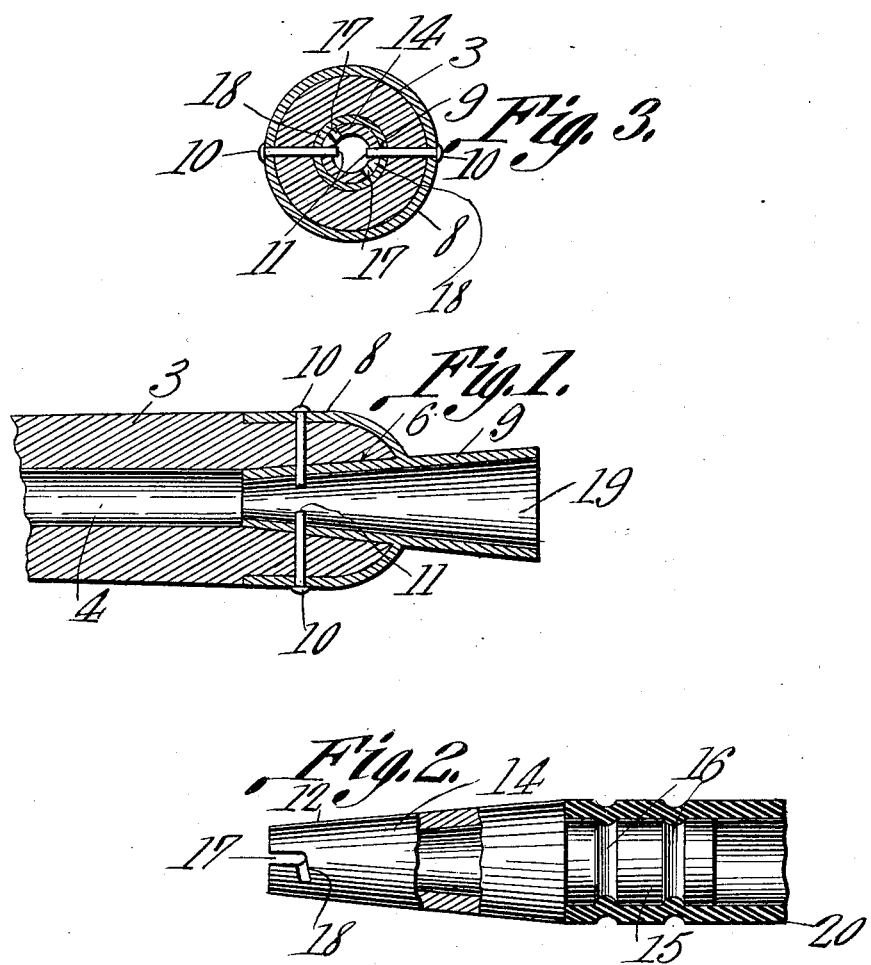

UNITED STATES PATENT OFFICE.

BURTON R. LONG, OF PUEBLO, COLORADO.

PIPE-COUPLING.

1,046,817.

Specification of Letters Patent. Patented Dec. 10, 1912.

Application filed August 2, 1910. Serial No. 575,159.

*To all whom it may concern:*

Be it known that I, BURTON R. LONG, a citizen of the United States, residing at Pueblo, in the county of Pueblo and State of Colorado, have invented a new and useful Pipe-Coupling, of which the following is a specification.

The present invention aims to provide a three part pipe coupling, one of the parts of which, constitutes means for holding in place, a pin which connects the other two parts; the pin holding the first named part engaged with one of the two other parts. The invention aims further to provide a coupling which may be set up and taken down without the use of tools.

The drawings show typical embodiments merely, and it is to be understood that changes, properly falling within the scope of what is claimed, may be made without departing from the spirit of the invention.

In the accompanying drawings,—Figure 1 is a fragmental longitudinal section; Fig. 2 is a side elevation of the supplemental member, parts being broken away and sectioned; and Fig. 3 is a transverse section of the coupling, showing the supplemental member engaged with the main member.

In carrying out the invention there is provided, as a primary and fundamental element, main tubular member 9 having spaced walls 8 and 6 at one end, and provided with a tapered bore 19. An auxiliary tubular member 3, having a bore 4, is terminally inserted between the walls 6 and 8. Oppositely disposed pins 10 are extended through the walls 6 and 8 and through the auxiliary member 3, the inner ends of the pins 10 protruding into the bore 19 of the main member 9, as shown at 11.

A tubular supplemental member 12 is provided, the same having a tapered end 14 adapted to fit rotatably in the bore 19 of the main member 9, and to be wedged therein. The end 20 of the supplemental member 12 is adapted to receive a hose, and in order to hold the hose, the end 20 may be circumferentially grooved as at 16. The bore 15 of the supplemental member 12 communicates with the bores 19 and 4 of the members 9 and 3, respectively.

Opening through the end wall of the part 14 of the supplemental member 12 are bayonet slots 17, one portion 18 of which is disposed diagonally of the axis of the supplemental member 12. When the end 14 of the member 12 is inserted into the bore 19 of the member 9, the ends 11 of the pins 10 will enter the mouths of the bayonet slots 17. When the supplemental member 12 is rotated in the main member 9, the ends 11 of the pins 10 will ride into the diagonal portions 18 of the bayonet slots 17. By this operation the end 14 of the member 12 will be advanced into the tapered bore 19 of the member 9 and be wedged therein. At the same time, the ends 11 of the pins 10 will be bound in the diagonal portions 18 of the bayonet slots 17. Thus the pins 10 will be held engaged with the walls 6 and 8 and with the auxiliary member 3.

The members 3, 9 and 12 may be assembled without the use of tools, the insertion and rotation of the tapered end 14 of the member 12 serving to engage the ends 11 of the pins 10, to bind the several members 3, 9 and 12 together.

Having thus described the invention, what is claimed is:—

A pipe coupling comprising a tubular main member having spaced walls and provided with a tapered bore; an auxiliary tubular member terminally inserted between the walls; a pin extended through the walls and through the auxiliary member, one end of the pin protruding into the bore of the main member; a tapered, tubular supplemental member mounted in the bore of the main member, and having a bayonet slot one portion of which is disposed diagonally of the axis of the supplemental member and is engaged with the protruding end of the pin, thereby to bind the pin and to wedge the supplemental member in the bore of the main member.

In testimony that I claim the foregoing as my own, I have hereto affixed my signature in the presence of two witnesses.

BURTON R. LONG.

Witnesses:
CARRIE C. LONG,
ADDA DOHERTY.